United States Patent
Grün et al.

(10) Patent No.: US 7,163,904 B2
(45) Date of Patent: Jan. 16, 2007

(54) COLORLESS GLASSES/BOROSILICATE GLASSES WITH SPECIAL UV-EDGE

(75) Inventors: Steffen Grün, Wallhausen (DE); Johann Faderl, Nieder-Hilbersheim (DE); Simone Ritter, Mainz (DE)

(73) Assignee: Schott AG, Mainz (DE)

( * ) Notice: Subject to any disclaimer, the term of this patent is extended or adjusted under 35 U.S.C. 154(b) by 280 days.

(21) Appl. No.: 10/675,224

(22) Filed: Sep. 30, 2003

(65) Prior Publication Data
US 2004/0132604 A1 Jul. 8, 2004

(30) Foreign Application Priority Data
Sep. 30, 2002 (DE) ............... 102 45 880

(51) Int. Cl.
*C03C 3/089* (2006.01)

(52) U.S. Cl. ....................... 501/65
(58) Field of Classification Search ............ 501/65–67
See application file for complete search history.

(56) References Cited

U.S. PATENT DOCUMENTS

| 2,832,491 | A | | 4/1958 | Bramming | |
|---|---|---|---|---|---|
| 4,562,161 | A | * | 12/1985 | Mennemann et al. | 501/59 |
| 4,665,039 | A | * | 5/1987 | Kokubu et al. | 501/39 |
| 5,219,801 | A | * | 6/1993 | Shorrock et al. | 501/65 |
| 6,162,749 | A | * | 12/2000 | Brocheton et al. | 501/13 |
| 6,204,212 | B1 | * | 3/2001 | Kunert et al. | 501/67 |
| 6,727,198 | B1 | * | 4/2004 | Hashimoto et al. | 501/66 |
| 2004/0266603 | A1 | * | 12/2004 | Fechner et al. | 501/66 |
| 2005/0037911 | A1 | * | 2/2005 | Fechner et al. | 501/66 |

FOREIGN PATENT DOCUMENTS

| DE | 38 22 733 A1 | | 2/1989 |
|---|---|---|---|
| DE | 195 32 800 A1 | | 2/1997 |
| EP | 0 151 346 | | 8/1985 |
| EP | 0 505 061 A2 | | 9/1992 |
| EP | 0 953 549 A1 | | 11/1999 |
| GB | 2 002 341 A | | 2/1979 |
| JP | 52066512 A | * | 6/1977 |
| JP | 62187141 A | * | 8/1987 |
| WO | WO 200116042 A1 | * | 3/2001 |

OTHER PUBLICATIONS

Derwent Abstract 1977-49555Y, abstract of JP 52-66512 A.*
Derwent Abstract 1987-268123, abstract of JP 62-187141 A.*

* cited by examiner

*Primary Examiner*—J. A. Lorengo
*Assistant Examiner*—Elizabeth A. Bolden
(74) *Attorney, Agent, or Firm*—Pauley Petersen & Erickson

(57) ABSTRACT

A borosilicate glass, having a spectral edge wavelength in a UV range of 280 to 325 nm, which can be set in a simple and defined manner, with the composition in percent by weight on an oxide basis of 60–75% $SiO_2$, 10–15% $B_2O_3$, 5–15% $Na_2O$, 5–10% $K_2O$, 0–5% $Li_2O$, 0.1–1 CaO, 0.5–3% BaO, >0–1.7% $TiO_2$, 0–0.5% $Sb_2O_3$, and normal refining agents.

22 Claims, 1 Drawing Sheet

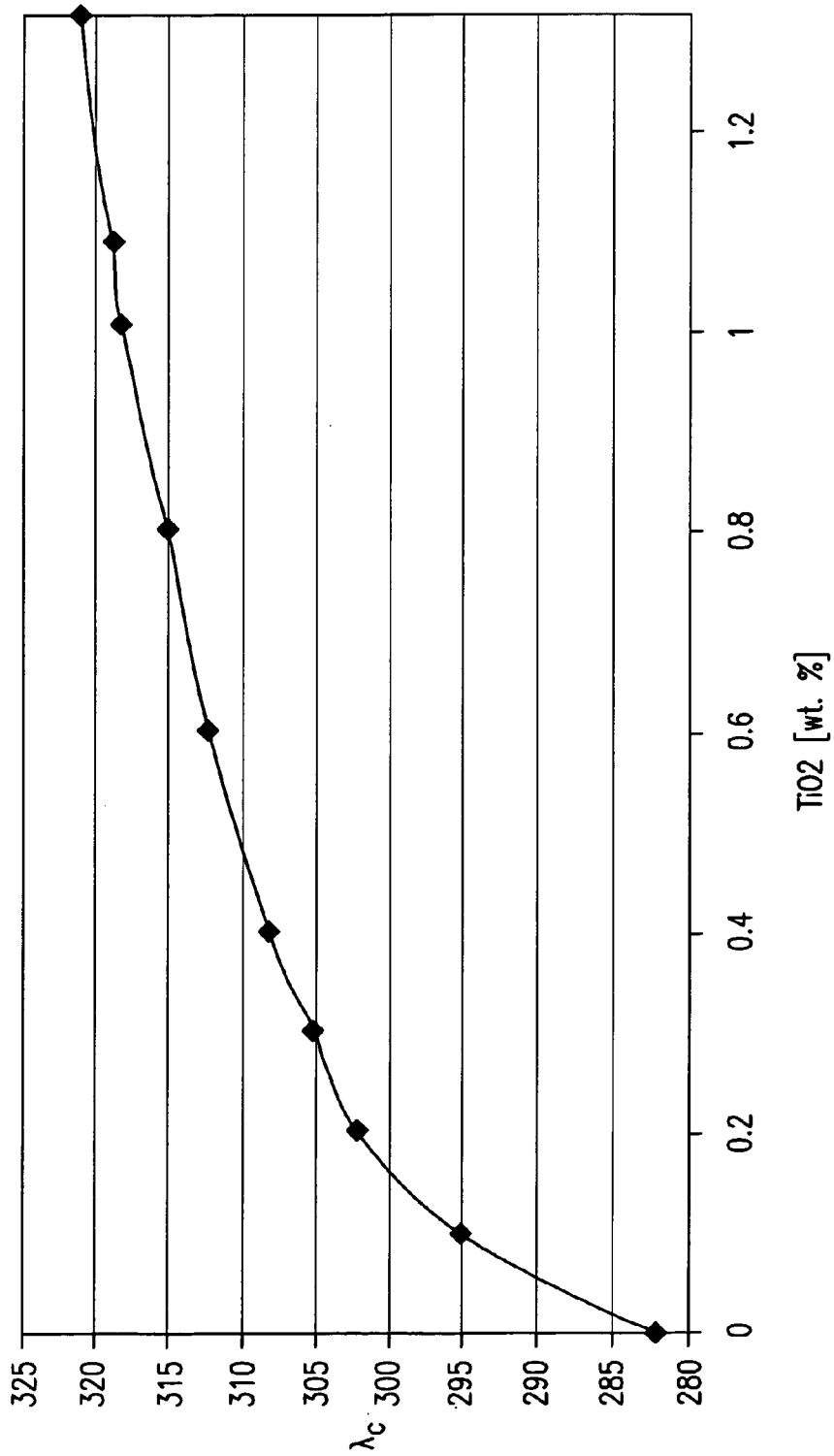

COLORLESS GLASSES/BOROSILICATE GLASSES WITH SPECIAL UV-EDGE

BACKGROUND OF THE INVENTION

1. Field of the Invention

This invention relates to a borosilicate glass with a special absorption edge, and to uses for the borosilicate glass.

2. Discussion of Related Art

In order to filter, in a targeted manner, a UV range which generally is defined as below 400 nm and can be divided into three sub-ranges, UVA, UVB and UVC, so-called colorless glasses or also optical glasses with defined absorption edges are used. The absorption edge or edge wavelength $\lambda_c$ corresponds to half of the pure transmission maximum value between the blocking and permeable range.

A spectacle glass is known from European Patent Reference EP 0 151 346 B1 which has a UV edge in the range between 325 nm and 335 nm. $TiO_2$ is added to the glass for this purpose. The proportion of $TiO_2$ is thus 4–6% by weight on an oxide basis.

This type of glass is not suitable for commercial application cases, in which a dimensional stability even at high glass transformation temperatures, for example >560° C., and/or a stable thermal expansion coefficient is required.

A stable expansion coefficient facilitates the incorporation or respectively exchange of the glasses in components.

Another important aspect for the glasses in such technical applications is their transmission course including the UV edge. A defined steep UV edge is required in the UV range corresponding to the application purpose. For example, for illumination tables for burning-in phosphorus units into television screen units, UV radiation of >320 nm is required. For experiments with plants in plant cultivation, hard UV radiation of >280 nm is also definitely used. Weathering instruments for quality control change the UV ranges, and thus filters according to each requirement.

Japanese Patent Reference JP 52-66512 A describes UV filter glass with an absorption edge of approximately 370 nm made of a borosilicate glass which necessarily contains $CeO_2$ and otherwise in combination with $TiO_2$. The $CeO_2$ significantly increases the material costs in the glass. In addition, $CeO_2$ has a negative effect on the solarization of the glass.

German Patent Reference DE 639 456 A1 describes a lamp glass, made of a glass with a relatively wide composition range, in which $SiO_2$, $B_2O_3$ are components and $Al_2O_3$, MgO, CaO, BaO, BeO, $Na_2O$ and $K_2O$ can be contained. The glass has no defined UV edge or optical situations.

United Kingdom Patent Reference GB 20 02 341 describes an optical fibre glass with a relatively wide composition range, in which $SiO_2$, $B_2O_3$ are components and $Al_2O_3$, MgO, CaO, BaO, SrO, $Na_2O$ and $K_2O$ can be contained. The glass has no defined UV edge, but rather glasses/fibres with refraction index gradients.

U.S. Pat. No. 2,832,491 corresponds to a method patent, which is suitable for pre-loading of glass panes. The composition of the glass which is suitable for pre-loading contains in turn $SiO_2$ and $B_2O_3$ as components in a relatively wide range. Exact UV edges and optical situations cannot be set with this glass.

German Patent Reference DE 195 32 800 A1 comprises the use of glasses for disinfection. A high transmission in the UVB and UVC range with reduced transmission in the visible and IR range is ensured by these glasses. Consequently, glasses with high transmission in the pass range are not possible.

German Patent Reference DE 38 22 733 A1 describes solder glass made of a glass with a relatively wide composition range, in which $SiO_2$, $B_2O_3$ are components and $Al_2O_3$, MgO, CaO, BaO, SrO, ZnO, $Li_2O$, $Na_2O$ and $K_2O$ can be contained, containing at most 1% by weight alkaline earth metal oxides. An alkaline earth content of at least 1% by weight ensures a good chemical resistance, which permits the application of these filter glasses in a humid climate. The glass taught by German Patent Reference DE 38 22 733 A1 does not make it possible to set a defined UV absorption edge.

European Patent Reference EP 0 505 061 A1 describes glass for protection covers for gallium arsenide solar cells with high UV absorption in the wavelength range of less than 320 nm. It contains $SiO_2$, $B_2O_3$, $Na_2O$, $K_2O$ and $CeO_2$ as components. $Al_2O_3$, $TiO_2$, MgO, CaO, ZnO, SrO, BaO, PbO, $Li_2O$, $As_2O_3$, $Sb_2O_3$ and F are optionally contained. High UV transmissions are specifically avoided in the case of the described glasses.

European Patent Reference EP 0 953 549 A1 describes glass for glass plates and substrates, which are used in electronics. The physical properties, such as expansion coefficient, the lower strain point, the density and the oxygen atom density are essential here. However, the UV absorption edge or the optical properties are not relevant for these glasses.

SUMMARY OF THE INVENTION

It is one object of this invention to provide a UV permeable glass, the absorption edge of which can be set in a defined and simple manner in a range between 280 and 325 nm. The glass is dimensionally stable at high operating temperatures and has a relatively constant thermal expansion coefficient.

This object can be achieved by a glass according to features described in this specification and in the claims.

In one embodiment a borosilicate glass is provided with a composition in a percent by weight on an oxide basis, including: 60–75% $SiO_2$, 10–15% $B_2O_3$, 5–15% $Na_2O$, 5–10% $K_2O$, 0.1–1% CaO, 0.5–3% BaO, >0–1.7% $TiO_2$, 0-0.5% $Sb_2O_3$, and normal refining agents, and having an edge wavelength $\lambda_c$ between 280 nm and 325 nm and a pass range internal transmittance ($\tau_{ip}$) of greater than 98% and an optical density in a stop range of $1\times10^5$ with a sample thickness of 2 mm.

The borosilicate glass which is used fulfills the requirements in temperature and dimensional stability. The borosilicate glass can thereby be made available with a defined absorption edge between 280 and 325 nm, with high transmission in the pass range, high optical density in the stop range and specific refraction indices and Abbé numbers. This is possible merely by varying the content of $TiO_2$ in the glass system.

The continuous production with cut-off wavelengths $\lambda_c$ of 280 to 325 nm is essential for these glasses. This continuous production is ensured because of the uniform base glass. $TiO_2$ is used as doping for the desired steep absorption edge, an addition not required in the case of very low cut-off wavelengths of <290 nm. This type of production saves costs and time, for example it avoids long remelting phases, in which no usable glass is produced.

All the glasses described here, apart from being used as colorless glass with specific absorption edges, are used also as optical glasses with defined refraction indices $n_d$ and dispersion $v_d$. As a result, uses in the field of imaging optics, projection, telecommunications, optical communications technology and microlithography are possible.

A glass with the desired optical and physical properties comprises preferably a basic glass system of 60 to 70% by weight $SiO_2$, 10 to 15% by weight $B_2O_3$, 5 to 15% by weight $Na_2O$, 5 to 10% by weight $K_2O$, 0.1 to 1% by weight CaO, 0.5 to 3 BaO and optionally 0.5–2.5% SrO, 0.1–1% MgO, 0 to 5% by weight $Li_2O$ (preferably Li free), 0 to 2 $TiO_2$, O to 0.5% by weight $Sb_2O_3$ and normal refining agents.

The glass according to this invention contains $SiO_2$ in the % by weight range between 60 to 75%, preferably 65 to 75% by weight, and functions as glass former. Higher contents would impair the meltability, and lower contents would make the glass formation difficult. Lower $SiO_2$ proportions in the glass would also result in Abbé numbers which are too low.

$B_2O_3$ is a glass former exactly like $SiO_2$ and improves the meltability by reducing the viscosity. The glass according to this invention contains 5 to 15% by weight $B_2O_3$, and preferably 10 to 13% by weight. Lower contents than 5% by weight $B_2O_3$ would impair the meltability of the glasses, whereas higher contents than 15% by weight $B_2O_3$ impair the chemical resistance of the glass.

The contained alkali oxides $Na_2O$ (5 to 15% by weight, and preferably 6 to 12% by weight) and $K_2O$ (5 to 10% by weight) can improve the meltability, for example to reduce the viscosity. With alkali contents which are too high, above all the hydrolytic resistance would be impaired, but also, to a lesser extent, the resistance to alkali liquor. Above all, however, the Abbé number is reduced too greatly.

Of the alkaline earth oxides, CaO with 0.1 to 1% by weight, and preferably 0.1 to 0.5% by weight, and BaO with 0.5 to 3% by weight, preferably 0.5 to 2.5% by weight, are contained in the glass according to this invention. The alkaline earth oxides reduce the melt viscosity, repress the crystallisation and contribute to improving the resistance to alkali. CaO is thus present in the glass at least with 0.1% by weight and BaO with at least 0.5% by weight. Both oxides are likewise indispensable for the setting of the optical situation. With higher contents, the Abbé number in turn may be reduced too greatly.

$TiO_2$ is an optional component for setting the UV situations greater than 280 nm. However more than 1.7% by weight of $TiO_2$ in the glass scarcely still effects a noticeable displacement of the UV edge in the longer-wave range in this glass system, and promotes devitrification. In addition, too high an amount of $TiO_2$, as indicated, generally increases the refractive index too greatly and reduce the Abbé number too greatly.

The glass can be manufactured free of expensive $CeO_2$ apart from unavoidable impurities. This is advantageous for the steepness of the transmission curve during the transition from the stop to the pass range and for the solarisation resistance.

The glass can also be free of PbO and of $As_2O_3$ apart from unavoidable impurities. The glass can thus be free of toxic components and therefore can be ecologically harmless.

$Sb_2O_3$ is optionally a component and serves for use as refining agent. However, other normal refining agents are likewise possible.

BRIEF DESCRIPTION OF THE DRAWING

FIG. 1 shows a graphical representation of an absorption edge situation for a given glass composition.

DESCRIPTION OF PREFERRED EMBODIMENTS

Normal optical raw materials are used for producing the exemplary embodiments of glasses.

The well homogenized glass batch was melted, refined and homogenized in the laboratory in a Pt crucible at 1420° C. Subsequently the glass was cast and cooled at 20 K/h.

TABLE 1 shows a melt example of a 0.51 melt:

| Oxides | % by weight | | Raw material | Initial weight (g) |
|---|---|---|---|---|
| $SiO_2$ | 69.98 | | $SiO_2$ | 772.65 |
| $B_2O_3$ | 11.19 | | $H_3BO_3$ | 219.5 |
| $Na_2O$ | 9.49 | | $NaNO_3$ | 287.79 |
| $K_2O$ | 7.29 | 3.8 | $K_2CO_3$ | 61.69 |
| | | 3.49 | $KNO_3$ | 82.78 |
| CaO | 0.2 | | $CaCO_3$ | 3.94 |
| BaO | 1.35 | | $Ba(NO_3)_2$ | 25.38 |
| $TiO_2$ | 0.20 | | $TiO_2$ | 2.22 |
| $Sb_2O_3$ | 0.30 | | $Sb_2O_3$ | 3.31 |

The properties of the glass of Table 1 are indicated in Table 2, Example 3.

TABLE 2 shows 9 examples of glasses according to the invention (1 to 9) with their compositions (in % by weight on an oxide basis) and their essential properties:

| Oxides | Example No. | | | | | | | | |
|---|---|---|---|---|---|---|---|---|---|
| | 1 | 2 | 3 | 4 | 5 | 6 | 7 | 8 | 9 |
| $B_2O_3$ | 11.21 | 11.20 | 11.19 | 11.18 | 11.17 | 11.15 | 11.12 | 11.10 | 11.07 |
| BaO | 1.35 | 1.35 | 1.35 | 1.35 | 1.35 | 1.34 | 1.34 | 1.34 | 1.34 |
| CaO | 0.20 | 0.20 | 0.2 | 0.20 | 0.20 | 0.20 | 0.20 | 0.20 | 0.20 |
| $K_2O$ | 7.31 | 7.30 | 7.29 | 7.28 | 7.28 | 7.26 | 7.25 | 7.23 | 7.21 |
| $Na_2O$ | 9.51 | 9.50 | 9.49 | 9.48 | 9.47 | 9.45 | 9.43 | 9.41 | 9.39 |
| $Sb_2O_3$ | 0.28 | 0.30 | 0.3 | 0.30 | 0.30 | 0.30 | 0.30 | 0.30 | 0.30 |
| $SiO_2$ | 70.13 | 70.05 | 69.98 | 69.91 | 69.84 | 69.70 | 69.56 | 69.42 | 69.21 |
| $TiO_2$ | 0.01 | 0.10 | 0.20 | 0.30 | 0.40 | 0.60 | 0.80 | 1.00 | 1.30 |
| Properties | | | | | | | | | |
| $\lambda_c$(d = 2 mm) [nm] | 283 | 295 | 302 | 304 | 308 | 312 | 315 | 318 | 320 |
| $n_d$(20 K/h) | 1.51423 | 1.51474 | 1.51527 | 1.51566 | 1.51633 | 1.51718 | 1.51805 | 1.51986 | 1.52056 |
| $V_d$ (20 K/h) | 64.32 | 64.15 | 63.90 | 63.69 | 63.48 | 63.01 | 62.60 | 62.03 | 61.58 |

TABLE 2-continued shows 9 examples of glasses according to the invention (1 to 9) with their
compositions (in % by weight on an oxide basis) and their essential properties:

| Oxides | Example No. | | | | | | | | |
| --- | --- | --- | --- | --- | --- | --- | --- | --- | --- |
| | 1 | 2 | 3 | 4 | 5 | 6 | 7 | 8 | 9 |
| $\alpha_{(20/300°\ C.)}$ [$10^{-6}$/K] | 8.2 | 8.2 | 8.1 | 8.2 | 8.2 | 8.1 | 8.1 | 8.1 | 8.1 |
| Tg[° C.] | 571 | 573 | 570 | 572 | 575 | 568 | 567 | 578 | 578 |

The absorption edge situation, dependent upon the $TiO_2$ content, for a given glass composition is plotted in FIG. 1. As shown, the absorption edge can be set in a targeted and reproducible manner as a result of the dosed addition of $TiO_2$.

German Patent Reference 102 45 880.4-45, the priority document corresponding to this invention, and its teachings are incorporated, by reference, into this specification.

The invention claimed is:

1. A borosilicate glass with a composition in a percent by weight on an oxide basis, including: 60–75% $SiO_2$, 10–15% $B_2O_3$, 5–15% $Na_2O$, 5–10% $K_2O$, 0.1–1% CaO, 0.5–3% BaO, >0–1.7% $TiO_2$, 0–0.5% $Sb_2O_3$, and normal refining agents, and having an edge wavelength $\lambda_c$ between 280 nm and 325 nm and a pass range internal transmittance ($\tau_{ip}$) of greater than 98% and an optical density in a stop range of $1 \times 10^5$ with a sample thickness of 2 mm.

2. A borosilicate glass according to claim 1, wherein the composition in the percent by weight on an oxide basis includes 65–75% $SiO_2$, 10–13% $B_2O_3$, 6–12% $Na_2O$, 5–10% $K_2O$, 0.1–0.5% CaO, 0.5–2.5% BaO, >0–1.7% $TiO_2$, 0–0.5% $Sb_2O_3$, and normal refining agents.

3. A borosilicate glass according to claim 2, wherein the composition in the percent by weight on the oxide basis further includes 0.5–2.5% SrO, 0.1–1% MgO, and 0–5% $Li_2O$.

4. A borosilicate glass according to claim 3, wherein the composition is free of $As_2O_3$, PbO and $CeO_2$, apart from unavoidable impurities.

5. A borosilicate glass according to claim 4, wherein the edge wavelength is in a range between 280 to 295 nm, and a $TiO_2$ content of greater than 0 to 0.1% by weight on an oxide basis.

6. A borosilicate glass according to claim 4, wherein the edge wavelength is in a range between 290 and 305 nm, and a $TiO_2$ content of 0.05 to 0.3% by weight on an oxide basis.

7. A borosilicate glass according to claim 4, wherein the edge wavelength is in a range between 300 to 315 nm, and a $TiO_2$ content of 0.16 to 0.8% by weight on an oxide basis.

8. A borosilicate glass according to claim 4, wherein the edge wavelength is in a range between 310 to 325 nm, and a $TiO_2$ content of 0.5 to 1.7% by weight on an oxide basis.

9. A borosilicate glass according to claim 8, wherein the glass comprises a UV cut-off filter in at least one of a UVB range and a UVC range.

10. A borosilicate glass according to claim 9, wherein the glass comprises a filter glass for one of illumination tables and weathering instruments.

11. A borosilicate glass according to claim 9, wherein the glass comprises an optical glass for imaging optics, projection, telecommunications, optical telecommunications technology and microlithography.

12. A borosilicate glass according to claim 11, having a transformation temperature Tg greater than 560° C., with a thermal expansion coefficient $\alpha_{(20/300)}$ between 7.5 and $8.8 \times 10^{-6}$/K, and a steep edge wavelength between 275 nm and 325 nm.

13. A borosilicate glass according to claim 1, wherein the composition in the percent by weight on the oxide basis further includes 0.5–2.5% SrO, 0.1–1% MgO, and 0–5% $Li_2O$.

14. A borosilicate glass according to claim 1, wherein the composition is free of $As_2O_3$, PbO and $CeO_2$, apart from unavoidable impurities.

15. A borosilicate glass according to claim 1, wherein the edge wavelength is in a range between 280 to 295 nm, and a $TiO_2$ content of greater than 0 to 0.1% by weight on an oxide basis.

16. A borosilicate glass according to claim 1, wherein the edge wavelength is in a range between 290 and 305 nm, and a $TiO_2$ content of 0.05 to 0.3% by weight on an oxide basis.

17. A borosilicate glass according to claim 1, wherein the edge wavelength is in a range between 300 to 315 nm, and a $TiO_2$ content of 0.16 to 0.8% by weight on an oxide basis.

18. A borosilicate glass according to claim 1, wherein the edge wavelength is in a range between 310 to 325 nm, and a $TiO_2$ content of 0.5 to 1.7% by weight on an oxide basis.

19. A borosilicate glass according to claim 1, wherein the glass comprises a UV cut-off filter in at least one of a UVB range and a UVC range.

20. A borosilicate glass according to claim 1, wherein the glass comprises a filter glass for one of illumination tables and weathering instruments.

21. A borosilicate glass according to claim 1, wherein the glass comprises an optical glass for imaging optics, projection, telecommunications, optical telecommunications technology and microlithography.

22. A borosilicate glass according to claim 1, having a transformation temperature Tg greater than 560° C., with a thermal expansion coefficient $\alpha_{(20/300)}$ between 7.5 and $8.8 \times 10^{-6}$/K, and a steep edge situations wavelength between 275 nm and 325 nm.

* * * * *

UNITED STATES PATENT AND TRADEMARK OFFICE
CERTIFICATE OF CORRECTION

| | |
|---|---|
| PATENT NO. | : 7,163,904 B2 |
| APPLICATION NO. | : 10/675224 |
| DATED | : January 16, 2007 |
| INVENTOR(S) | : Steffen Grün et al. |

It is certified that error appears in the above-identified patent and that said Letters Patent is hereby corrected as shown below:

Claim 1, column 5, line 29, "$1 \times 10^5$" should be changed to --$1 \times 10^{-5}$--.

Signed and Sealed this

First Day of May, 2007

JON W. DUDAS
*Director of the United States Patent and Trademark Office*